Jan. 16, 1968        C. C. RAYBURN        3,364,401
CAPACITOR ASSEMBLY AND METHOD
Original Filed Dec. 14, 1965
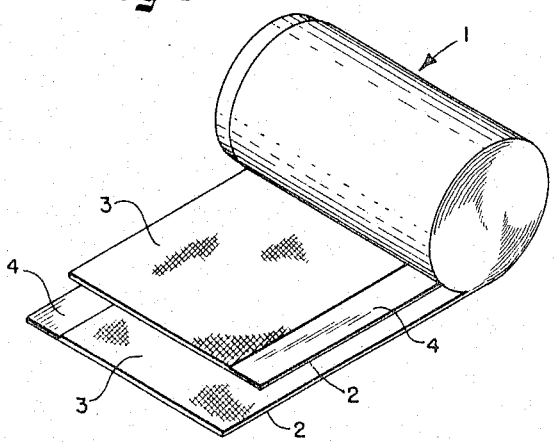
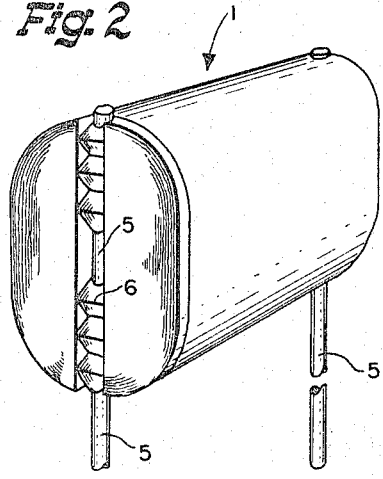
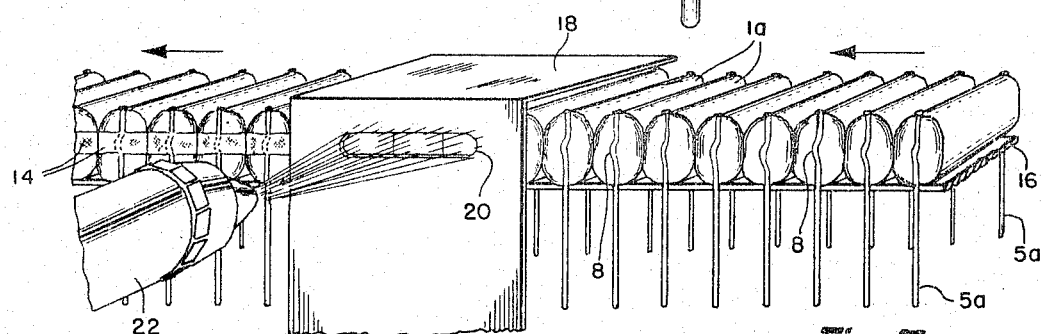
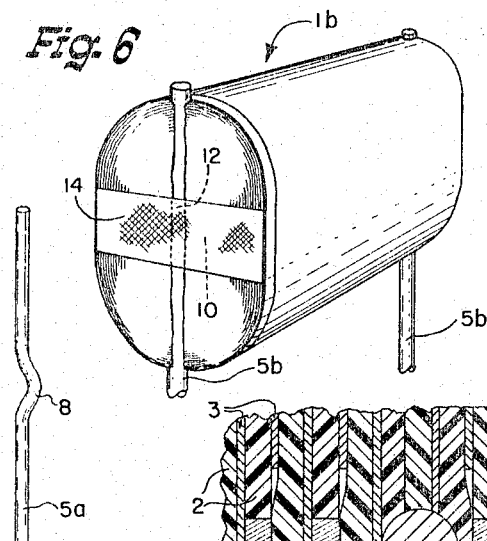
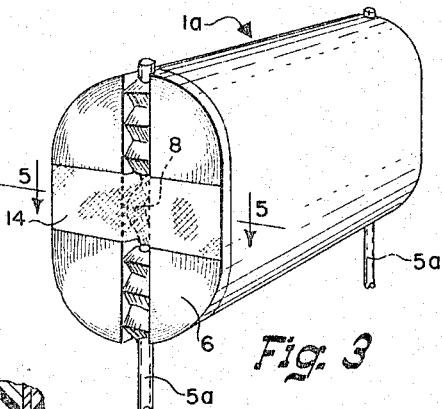
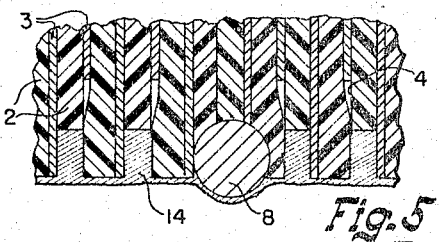
INVENTOR.
Charles C. Rayburn
BY Robert W. Beart
Barry L. Clark
His Att'ys United States Patent Office 3,364,401
Patented Jan. 16, 1968

3,364,401
CAPACITOR ASSEMBLY AND METHOD
Charles C. Rayburn, Falls Church, Va., assignor to Illinois Tool Works Inc., Chicago, Ill., a corporation of Delaware
Continuation of application Ser. No. 513,727, Dec. 14, 1965. This application Oct. 11, 1966, Ser. No. 585,870
12 Claims. (Cl. 317—260)

This application is a continuation of Ser. No. 513,727 filed Dec. 14, 1965 now abandoned.

This invention relates to an improved capacitor assembly and to a method of making such capacitor assembly and more particularly relates to an improved capacitor assembly of convolutely wound electrode and dielectric material as the capacitor body to which lead means are assembled in such manner as to provide a strong physical connection and to improve the electrical connection between lead means and electrode.

Convolutely wound capacitor bodies consist of two or more layers of electrode material alternately laminated with dielectric material intervening to electrically insulate successive layers of the electrode. Such dielectric material may be paper or plastic, the electrode material being metal of various choice but generally being a tin-lead alloy, aluminum or zinc as examples. In one form of capacitor construction the metal of choice is fabricated as a foil strip which is laminated with the dielectric in tape form. In another variety, the metal chosen as the electrode material is evaporated and subsequently deposited as a thin coating directly on the surface of the dielectric tape, two or more of such coated tapes then being laminated and convolutely wound to form a capacitor body. Although applicable to either form in which the metal is used to provide the electrode, this invention is particularly applicable to the latter form discussed above in which the electrode metal has been deposited directly on the dielectric tape which, when convolutely wound and lead means attached, becomes what is generally referred to as a metalized capacitor.

In either of these forms in which the electrode material is employed, the matter of assembling electrical lead means or wires to the capacitor body involves making substantial electrical contact between the lead means and the electrode layers so as to avoid either inductance effect or resistance heating which might result from inferior or incomplete connections between lead means and the electrode portion of the capacitor body. It has been found to be relatively simple to establish good contact with metallic foil on the order of 0.00025 inch (25 gauge) in thickness laminated with dielectric tape of similar (15–75 gauge) thickness. However, difficulties arise in assuring good electrical contact of the lead means in a capacitor formed of metalized dielectric tape which may have a coating of metal electrode on the order of only 0.000001 inch in thickness since the metal constitutes such a small portion of the end volume of the capacitor. For example, assuming a dielectric thickness of 25 gauge, a capacitor using foil electrodes would have 50% of its end volume made up of metal while a metalized capacitor would only have .4% metal.

One present-day method of assembling lead means to such convolutely wound capacitor bodies of metalized tape employs a solderable metal applied over portions of the ends of the capacitor body, the solder thus applied penetrating between extending edges of tape to thereby make contact with the metalized electrode coating. Following this, an axially extending lead is heated, tinned in a solder bath and rapidly applied to the solderable metal which was earlier applied over portions of the ends of the capacitor body. To increase the area of contact and resultant strength of attachment such axial leads generally have a pigtail terminal portion extending from the axis of the lead in radially increasing convolutions, which pigtail terminal portion abuts the end of the capacitor body and is embedded in the solder mass.

Such present-day methods of applying the lead means to the capacitor body have several disadvantages. The arbor hole constituting the winding axis of the capacitor body must be masked to prevent metal spray from entering the arbor hole. If the hole is not masked, the spray can completely traverse the arbor hole and electrically connect the opposite ends of the capacitor body where each of the two electrode layers are exposed, thereby causing a short circuit. In addition, if the end of either electrode foil or coating is exposed in the arbor hole, as is customary in beginning the winding, the metal spray entering the hole can readily produce a short circuit by reaching that exposed end of the electrode while also contacting the other electrode through that portion sprayed on one end of the capacitor body. To meet these problems, it has heretofore been necessary to mask the arbor hole before spraying takes place. The masking must be accurately positioned on the capacitor ends and concentric placement of the convolute terminal portion of the pigtail lead means must be precise. These aspects require considerable hand labor making production costs relatively high. Even with the masking properly oriented and with the solderable metal applied to the ends of the capacitor body, the remaining matter of physically applying the lead means is rather difficult. Specifically, thermal control of the soldering step is a problem because the lead means must be hot enough to melt the sprayed metal and if the temperature attained cannot be maintained it is necessary to use a soldering iron. Such a step obviously lacks control and introduces the possibility of melting the dielectric in the capacitor body. Should this occur, the contact with the vapor deposited electrode becomes random, the dielectric in melting becoming a non-continuous support of the very thin metal coating of electrode. Where the contact between the sprayed end and the electrode material is in any way diminished, an electrical resistance is introduced which, during charging and discharging of the capacitor, will produce heat with further destructive effect.

Certain undesirable aspects also arise due to the use of solder in the present-day methods of electrical lead means attachment. Commercial solder is a low melting point alloy differing from any metal having general use as either electrical lead means or capacitor electrode material. In the presence of moisture, such differences in material produce electrochemical activity between the solder and the metal in either the electrode or lead means which can cause the solder joint to fail. Furthermore, there is the very substantial problem of making a good solder connection with aluminum when used as electrode material because of aluminum oxide present on the surface.

Accordingly, it is an object of this invention to provide an improved capacitor assembly which does not have a solder connection between the lead means and capacitor electrode.

An additional object is to provide a method for establishing superior electrical connection between the lead means and electrode material, this method having particular utility in capacitor construction employing metalized dielectric film in its construction.

A further object is to eliminate the use of pigtail lead means thereby reducing capacitor cost by: reducing the length of the lead means, by eliminating the forming costs of such lead means, and by eliminating the precision placement of such lead means employed in present-day capacitor construction.

These and related objects are accomplished in the present invention by first partially embedding the lead means in the thermoplastic dielectric at the ends of the capacitor body, the lead means being placed transverse to the winding axis of the capacitor body, and then spraying a coating of metal on a portion of the end of the capacitor body containing the partially embedded lead means. In this manner, the lead means is held in place by the fused thermoplastic dielectric and the electrical contact between the lead means and the electrode material is assured and enhance by the sprayed metal which flows into contact with the layers of electrode material.

Further description of the invention will be given with reference to the accompanying drawings in which FIG. 1 is a perspective view of a capacitor body of metalized or metal coated thermoplastic dielectric layers shown before convolute winding of the capacitor body into a substantially cylindrical shape has been completed.

FIG. 2 is a perspective view of a capacitor assembly comprising a capacitor body which has been flattened and into which lead means have been partially embedded by means of a representative tool so shaped as to permit the melted thermoplastic dielectric tape to be formed into ribs overlying a portion of the wire lead means.

FIG. 3 is a perspective view, after metal spraying in the apparatus of FIG. 7, of a modification of the capacitor shown in FIG. 2 wherein the wire leads include an offset portion extending outwardly from the ends of the capacitor.

FIG. 4 is a side view of the wire lead used in the modification shown in FIG. 3.

FIG. 5 is a sectional view taken on line 5—5 of FIG. 3 showing how the sprayed metal coating contacts the electrode surfaces between layers.

FIG. 6 is a perspective view of another form of completed capacitor assembly wherein the leads are embedded in the ends of the capacitor body to an essentially uniform depth throughout the length along which contact is made, melting of the thermoplastic being effectuated without the additional heating and/or forming of the thermoplastic dielectric required in making the capacitor shown in FIGS. 2 and 3.

FIG. 7 is a schematic representation is perspective of the method of applying sprayed metal to a portion of the ends of capacitor assemblies as they are suitably supported and moved past an opening in a shield through which the metal spray is directed.

In further detail, FIG. 1 shows a partially wound capacitor body 1 of commercially available metalized thermoplastic dielectric, the dielectric 2 being any of several plastic materials available in tape form such as polystyrene or polyethylene terephthalate on which electrode material, in the form of a vapor has been deposited as a thin film 3. Generally, the electrode material is deposited over a portion of the surface of the dielectric leaving a masked, uncoated margin 4 of dielectric. In another form where electrode material is deposited over the entire dielectric surface, applying an electrical potential difference between the metal coating and an electrode produces an arc with sufficient heat to melt the coating, its removal being accomplished by boiling it away or by frictional removal of the melted metal.

The electrode material is commonly chosen from metals such as aluminum and zinc, zinc being somewhat easier to use because of its lower melting point and aluminum being relatively more inert and therefore somewhat safer and more easily handled. At the beginning and ending of the winding it is necessary to electrically separate one electrode layer from the other. This can be accomplished either by burning electrode material from the metalized surface at the beginning and end of the winding or by inserting a small strip of dielectric to cover the ends of the two metalized dielectric strips. The burning preferably takes place in the coil winding apparatus (not shown) just prior to severing, the burned off portion comprising the end portion of one tape and the beginning of the next. By having a metal-free portion at the beginning of the tape, there can be no electrical shorting if particles of metal spray get past the wire leads and into the core area of the capacitor.

After winding is completed, which generally is concluded by sealing the end of the outer layer of thermoplastic dielectric to itself, capacitor body 1 is heated and flattened under pressure to substantially eliminate the hole occupied by the arbor during winding. The flattening operation no only reduces the capacitor size, but also adapts the capacitors so that they can be sprayed in the apparatus of FIG. 7 without masking their sides against overspray. Lead means 5, as shown in FIG. 2, are then partially embedded in the ends of capacitor body 1 transverse to the winding axis of the capacitor body. Such partial embedment may be only an embedment of a portion of the circumference of wire lead means 5 (FIG. 6) or it may be an embedment of the entire circumference through only a portion of the length of the wire lead means 5 (FIGS. 2 and 3). The latter is done, for example, by using a forming tool such as is described in my U.S. Patent No. 3,243,675 to shape melted dielectric into ribs 6 overlying the rest of the length of contact between lead means 5 and capacitor body 1. In this latter method of embedment, an offset 8 on the order of one wire diameter (FIGS. 3–5) may be pre-formed into a short length of the lead means 5a at a point which will be centered on the capacitor end. This offset, oriented outwardly, assures exposure of a part of the lead means for more positive contact by electrically conductive material subsequently applied than is possible with the embedded straight wire 5 of the FIG. 2 embodiment.

Because of limited flow of the melted dielectric, it is possible, as shown in FIG. 6, to embed the wire lead means 5b into the end of the capacitor body 1b to a depth of the wire's diameter or more without covering the entire circumference of lead means 5b. Such embedment involves heating of lead means 5b with the heat content of the lead means at a level sufficient for melting the thermoplastic dielectric along the line of the two elements. Overlying both a portion 10 of the ends of capacitor body 1b and a portion 12 of wire lead means 5b is a coating of electrically conductive material 14 which assures a high degree of efficiency of electrical contact between the lead means and the electrode material in the capacitor body.

FIG. 7 shows an apparatus for applying a sprayed metal coating to capacitors. Capacitor assemblies comprising lead means 5a partially embedded in the ends of capacitor bodies 1a with a portion 8 of the lead means 5a exposed are shown stacked on the right end of belt 16. With the capacitor bodies thus supported, belt 16 is moved behind shield 18 having on its vertical portion a slot 20. Gun 22 is horizontally directed so as to apply a spray of electrically conductive material through slot 20 onto the ends of successive capacitor bodies with assembled lead means. The shield 18 is preferably made of copper since metals such as aluminum sprayed through it will either not adhere to it or may easily be wiped or brushed off.

Although the capacitors are shown (FIG. 7) as being fed on a belt 16 past a stationary metalizing gun 22, it would also be possible to mount a batch of capacitors on a fixed rack behind a shield having a slot long enough to expose the ends of all of the capacitors on the rack. The capacitors would be sprayed by traversing the gun the length of the slot.

No matter whether the capacitors are moved relative to the gun or the gun relative to the capacitors, the metal 14 which is sprayed against an end of the capacitor will enter between the offset dielectric layers and make contact with an axially extending portion of one of the electrodes 3 (FIG. 5). Since the sprayed metal coating is continuous across the width of the capacitor it will electrically connect the electrodes 3 to the lead 5. When lead 5 includes an offset portion 8 as seen in FIGS. 3 and 5, the contact area is increased as compared to the lead embodiments shown in FIGS. 2 and 6.

It is noted that the spray pattern emanating from the gun 22 in FIG. 6 is sufficiently wide to cause a portion of the metal spray 14 to be directed against both the right facing and left facing axially extending surfaces of the electrodes 3 rather than merely against the extremely narrow ends thereof.

If a gun having a much smaller spray pattern were used, it would be desirable to mount the gun at an angle relative to the capacitors to insure that the electrode surfaces 3 would be reached. An angularly mounted gun having a small spray pattern would only permit metal to hit the electrodes which face in one direction such as the electrode layers to the left of the lead offset 8 in FIG. 5. Accordingly, it would be desirable, if contact with the electrode layers is to be maximized, to change the angular position of the gun and make a second pass to permit the metal spray to reach the electrode layers to the right of the lead offset 8.

The capacitor construction and method of assembling the capacitor of this invention relate only to those capacitor assemblies comprising thermoplastic dielectrics such as the polyfluoroethylenes, polyesters such as polyethylene terephthalate, the polycarbonates, polystyrene and polypropylene. The choice of electrically conductive material to be used in spray form on the ends of the capacitor assembly will optimally be a metal exactly matched to the electrode material in the metalized dielectric capacitor since such matching produces long range reliability. By both the metal in the metalized coating of the dielectric layers and the metal chosen as the overspray being the same metal there would be no electrochemical action in the presence of moisture and no molecular movement due to different coefficients of expansion as would otherwise exist. In other words, any metal that can be evaporated at a temperature that will not produce damage when applied as a spray to the dielectric can be used. Because aluminum is suitable in metalized capacitor construction it will presumably be the electrically conductive material of choice in the practice of this invention. However, zinc also finds widespread use as electrode material and because it evaporates at a lower temperature than does aluminum, it is at least as suitable although its handling is somewhat more critical.

Although sufficient lead means attachment strength is obtained by the methods of embedment described herein, there may be certain applications requiring an outer coating of a resin to encapsulate the completed capacitor assembly and provide environmental protection. Such encapsulation would also add strength to the lead means connection.

The application of electrically conductive material as a band of sprayed metal does not interfere with the use of an impregnant which is sometimes employed in capacitor construction to eliminate any air that may have become entrapped between the layers constituting the capacitor body. Such impregnant increases the composite dielectric constant of the capacitor and by elimination of ionizable air, corona effect at high voltages is reduced or eliminated. Epoxy resins are illustrative of various impregnants that may be used, the use of a band of sprayed metal on the ends of the capacitor body readily permitting such impregnation as mentioned above which is not possible by prior art methods of lead attachment which require extensive covering of the capacitor ends by solder.

It can be seen that the method for producing the capacitor construction of the present invention wherein metal in the form of spray is applied over the end of the capacitor to which lead means has been attached with a portion of that lead means exposed, provides a capacitor with superior lead attachment strength and electrical reliability. Excellent electrical continuity is provided without the limitations on lead attachment resulting from the use of solder.

With the many modifications both mentioned and implicitly present, there is no intention to limit the scope of the invention except as indicated in the following claims.

I claim:

1. In a capacitor assembly having a plurality of convolutely wound layers of thermoplastic dielectric material and a coating of electrode material deposited on one surface of each of said layers so that first portions of the electrode coated thermoplastic in successive layers are in overlapping arrangement and second portions of the electrode coated thermoplastic in one layer are in non-overlapping arrangement relative to second portions in the other layer, said second portions forming the end surfaces of said assembly, the improvement comprising:
   electrical lead means positioned transverse to the capacitor winding axis and partially embedded in said spaced end surfaces; and
   a coating of electrically conductive material overlying and contacting at least an unembedded portion of said electrical lead means and at least a portion of said second portions of electrode coated thermoplastic forming said spaced end surfaces.

2. A capacitor assembly according to claim 1 wherein said electrical lead means comprises a length of wire which is straight in at least the area in which it is partially embedded in said spaced end surfaces and wherein a portion of the wire along the entire length of contact of the wire with the end surface of the capacitor is not embedded in said end surface.

3. A capacitor assembly according to claim 1 wherein said electrical lead means comprises a wire which is totally embedded by portions of said end surfaces on either side of the portion of the lead means contacted by the electrically conductive coating material.

4. A capacitor assembly according to claim 3 wherein said wire has an offset portion therein, said offset portion extending axially outwardly of said capacitor end surface with respect to the remainder of the wire and comprising the portion of said electrical lead means contacted by said coating of electrically conductive material.

5. A capacitor assembly according to claim 4 wherein said offset portion is offset by an amount equal to approximately one diameter of the wire.

6. A capacitor assembly according to claim 1 wherein said layers of thermoplastic dielectric material are wound in offset relation to each other, said electrically conductive coating material being in contact with axially extending portions of the second portions of the electrode coated thermoplastic;
   said layers of thermoplastic material being coated with said deposited electrode material to a width less than the full width of said layer of themoplastic material whereby said coating of electrically conductive material contacting the electrode material at the end of said capacitor in the region in which a layer of thermoplastic material is offset is isolated from contact with the electrode material on an adjacent layer.

7. A capacitor assembly according to claim 1 in which said electrically conductive material consists of the same material as said electrode material.

8. A capacitor assembly comprising:
   a pair of strips of thermoplastic dielectric material convolutely wound so that a first outer side edge of each extends axially outwardly from the second edge of the other to form the end surfaces of the capacitor;
   a metalized coating of electrode material extending across the width of each of said strips of dielectric material from said first edges to a line spaced from said second edge;
   a lead wire embedded in each end of said capacitor at spaced, radially outwardly extending portions of said end surfaces, the embedded portions of said lead wire being positioned axially inwardly of the end of the capacitor and firmly attached to said capacitor by overlying melted portions of said thermoplastic end surfaces;

each of said wires including a portion at the center of said capacitor end surface which is offset axially outwardly with respect to the portions of said wires which are embedded; and a coating of electrically conductive material applied in a band over a portion of the ends of said capacitor and in contact with portions of the coated electrode material on the first axially extending edges of said dielectric strips and with said offset portion of said lead wire for electrically connecting said lead wire to said electrodes.

9. A method of assembling electrical lead means to a convolutely wound capacitor body formed of axially spaced and overlapping layers of thermoplastic dielectric material having a coating of electrode material deposited thereon, each end of said capacitor body being formed by an edge of one of said layers of thermoplastic material and the electrode material deposited thereon which comprises the steps of:

partially embedding said electrical lead means in the ends of said capacitor body transverse to the winding axis of the wound body; and applying electrically conductive material in spray form as a continuous coating to at least a portion of said electrical lead means and to at least a portion of said ends of said capacitor body to electrically connect said lead means to said electrode material.

10. The method of claim 9 in which said electrically conductive material applied in spray form consists of the same material as said electrode material.

11. The method of claim 9 wherein said electrical lead means comprises a pair of wires having offset portions, each wire being embedded in an end of the capacitor so that the offset portion extends axially outwardly of the capacitor body, the offset portion further comprising the portion of said electrical lead means to which said sprayed electrically conductive material is applied.

12. A method of making a metalized capacitor comprising the step of:

convolutely winding a pair of metalized thermoplastic dielectric strips in an offset relationship to each other whereby when said capacitor is wound, each of the opposite ends thereof will be formed by an edge of one of said metalized dielectric strips, the adjacent convolutions at each of said ends being spaced from each other a distance equal to the thickness of one of said strips;

compressing said capacitor from opposite sides thereof to change its cross-sectional shape from circular to elliptical;

pressing a pair of heated lead wires having offset portions thereon into the ends of said capacitor and melting and molding portions of the thermoplastic end portions around portions of said lead wires adjacent said offset portion;

mounting a plurality of said capacitors side by side with their compressed portions in contact with each other;

moving said plurality of capacitors relative to a metal spraying gun; and directing the spray from said gun through a shield and in a band across the ends of said capacitors so as to cause said metal spray to apply a coating of electrically conductive material to the offset portions of said lead means and between the spaced convolutions at said ends onto the axially extending portions of said metalized dielectrics forming the ends of said capacitor.

References Cited

UNITED STATES PATENTS 3,243,675    3/1966    Rayburn _____ 317—260

LARAMIE E. ASKIN, *Primary Examiner.*

E. GOLDBERG, *Assistant Examiner.*